United States Patent [19]
Montano

[11] Patent Number: 6,125,835
[45] Date of Patent: Oct. 3, 2000

[54] CAMPING RANGE

[76] Inventor: Robert A. Montano, 3100 Boone St., Fort Collins, Colo. 80526

[21] Appl. No.: 09/129,024

[22] Filed: Aug. 4, 1998

[51] Int. Cl.[7] ....................................................... F24C 1/16
[52] U.S. Cl. ............................ 126/9 R; 126/9 B; 126/29; 126/275 R; 126/19 M; 126/4; 220/4.27; 220/4.28
[58] Field of Search ..................................... 126/9 R, 9 B, 126/29, 30, 38, 25 R, 275 R, 19 M, 4, 25 B; 220/4.26, 4.28, 4.33, 4.21, 4.27

[56] References Cited

U.S. PATENT DOCUMENTS

| | | | |
|---|---|---|---|
| D. 375,262 | 11/1996 | Swatkiewicz | D9/431 |
| 549,056 | 10/1895 | Buzzcott | 126/9 R |
| 1,176,233 | 3/1916 | Mead | 126/540 |
| 1,198,693 | 9/1916 | Bond | 126/9 R |
| 1,486,875 | 3/1924 | Freeman . | |
| 1,701,033 | 2/1929 | Elbert | 126/9 R |
| 1,780,068 | 10/1930 | Dorman | 126/29 |
| 2,172,769 | 9/1939 | Luedtke | 248/165 |
| 2,201,756 | 5/1940 | Avetta | 126/30 |
| 2,774,345 | 12/1956 | Peplin | 126/9 B |
| 2,855,918 | 10/1958 | Tescula | 126/25 |
| 2,923,229 | 2/1960 | Halford | 99/339 |
| 2,962,019 | 11/1960 | Lundgren | 126/25 |
| 3,000,372 | 9/1961 | Hall | 126/9 |
| 3,131,686 | 5/1964 | Budd | 126/25 |
| 3,175,549 | 3/1965 | Bergsten | 126/25 |
| 3,302,555 | 2/1967 | Burwell | 99/390 |
| 3,421,433 | 1/1969 | Vitale | 99/340 |
| 3,450,123 | 6/1969 | Tidd | 126/25 |
| 3,572,313 | 3/1971 | Ciancaglini | 126/9 |
| 3,742,838 | 7/1973 | Luschen et al. | 99/389 |
| 3,827,423 | 8/1974 | Bolitho | 126/29 |
| 4,237,097 | 12/1980 | McDuffie | 431/289 |
| 4,508,096 | 4/1985 | Slattery | 126/9 R |
| 4,545,359 | 10/1985 | Hait | 126/9 R |
| 4,724,756 | 2/1988 | Sarparanta | 126/9 R |
| 4,793,320 | 12/1988 | Bakic | 126/25 B |
| 5,134,990 | 8/1992 | Bradfield | 126/25 B |
| 5,144,939 | 9/1992 | Christopherson | 126/25 R |
| 5,176,124 | 1/1993 | Wrasse | 126/25 R |
| 5,243,961 | 9/1993 | Harris | 126/9 R |
| 5,388,714 | 2/1995 | Zutler | 220/4.24 |
| 5,499,574 | 3/1996 | Esposito | 99/339 |

OTHER PUBLICATIONS

Cabela's Spring 1998 Catalog, pp. 126–129.
Cabela's Fall 1997 Catalog, pp. 324–327.
Cabela's 1996 Master Catalog, p. 283.
Cabela's 1996 Master Catalog, p. 297.
Cabela's 1996 Master Catalog, p. 301.
Cabela's 1996 Master Catalog, p. 310–311.
Sportsman Guide Catalog, p. 25.
Cylinder Stoves, Stoves • Tents • Frames, product brochure.

*Primary Examiner*—Ira S. Lazarus
*Assistant Examiner*—Josiah C. Cocks
*Attorney, Agent, or Firm*—Santangelo Law Offices, P.C.

[57] ABSTRACT

A collapsible camping range for use in a camping environment. The camping range can utilize a collapsible wall structure that facilitates portability. In addition, a multi-purpose cover to the camping range can be utilized to serve as a cover for the oven, a griddle for the cooking of food, a wash basin or basin for boiling water, and a receptacle in which the other parts of the camping range can be stowed. The camping range can be fabricated with oven walls that allow the oven chamber to be expanded for the cooking of large foods, such as for use as a pig roaster. Removable fuel containers can be utilized to facilitate the portability of the camping range as well as in a plurality of positions for heating purposes.

41 Claims, 11 Drawing Sheets

CAMPING RANGE

This invention relates generally to the field of camping ranges. Particularly, this invention relates to the field of camping ranges that are easily transportable and easily erectable at a campsite where minimization of weight and volume of the packed camping range is important in order to ease transportation and storage of the camping range.

BACKGROUND OF THE INVENTION

In the past, others have used a variety of devices to cook food in an outdoor setting. The earliest method of cooking food was likely the open campfire, where food on a spit could be cooked over the heat of a campfire. Later, devices were developed for the cooking of food indoors on a daily basis. Such devices have evolved into the modern day range, which allows the baking of food in an oven chamber as well as the cooking of food on a griddle. However, the development of a similar range that could meet the requirements for use outdoors has always been sorely lacking.

Indoor ovens and ranges that are used everyday and that form the center of a kitchen can afford to be large, heavy, bulky and expensive. Their stationary positions in the kitchen and the resulting lack of any need for portability permits them to be heavy and non-collapsible. Furthermore, the fact that they are utilized on a daily basis allows them to be expensive. Moreover, they can be hooked to convenient supplies of energy, such as electricity to supply heating coils or natural gas to supply burners given their stationary position and the convenience of such energy supplies in an indoor setting. However, these indoor ranges are totally inadequate when one desires to use them in a portable fashion in a camping environment. As a result, there is a need for a device that can duplicate both the oven and griddle features of an indoor range, while at the same time permitting it to be implemented in a camping/outdoor environment. This can involve portability, collapsibility, low cost, low weight, durability, reusability, adaptability to a variety of fuels, low storage volume, compactability, etc.

A survey of other devices that have been proposed shows the unfulfilled need for an outdoor camping range. For example, U.S. Pat. No. 2,172,769 showed the need for a portable cooking apparatus as early as 1939. While this device permitted it to be used as a source of heat for a skillet, it nevertheless could not be used to accomplish the functions of an indoor range of providing an oven and a griddle. Furthermore, while it stated that it was portable, it nevertheless appears to require a great deal of effort to assemble given the numerous pieces required. A device which requires a great deal of effort to assemble or disassemble would not meet the definition of "portable" for the present invention.

Others have elected to provide either a griddle function or an oven function in their devices—but not both. For example, U.S. Pat. Nos. 2,923,229; 3,742,838; 5,144,939; and 5,176,124 did not provide a griddle. Similarly, U.S. Pat. Nos. 3,302,555 and 5,499,574 did not provide an oven (i.e., a chamber or compartment, as in a stove, for baking, roasting, heating, drying, etc.). As a result, an individual cooking with these devices would be limited in the types of food he or she could prepare. In fact, what most manufacturers have opted to do rather than provide either a griddle or an oven is to merely provide a charcoal grill (i.e., a grated utensil for broiling meat, fish, vegetables, etc., over a heat source). This can be seen for example in U.S. Pat. Nos. 1,701,033; 2,201,756; 2,774,345; 2,855,918; 2,962,019; 3,131,686; 3,175,549; 3,421,433; 3,450,123; and 3,572,313.

As a result, the cooking options available with these devices is severely limited. A camper is primarily limited to cooking meats that can be grilled over hot coals in the ambient air environment. However, it is apparent from the functions that can be achieved by indoor ranges that both the feature of a griddle and an oven in the same device is highly desirable—as it allows for the cooking of a variety of food at the same time. Given the need to make the most of one's fuel in a camping environment, simultaneous cooking on the griddle and in the oven would be extremely advantageous.

There is also a need for a device that can prepare certain types of foods. Oftentimes, an outdoor setting lends itself to an activity where a lot of people are participating. For example, on weekends or at special outings, there will often be a gathering of a large group of people. As a result, a portable device is needed that can prepare foods that will serve a lot of people at the gathering. For example, the preparation of turkeys or the roasting of a pig or other large quantity of food is often desirable at these types of outings. The drawback in the past, however, has been that a cooking facility was needed at the site of the celebration. Therefore, in the past, the provision of a cooking facility at the site where the gathering would take place was necessary. Often, there are sites that would be appropriate for a gathering, but that have no adequate cooking facility. Hence, there is a need for a device that can be easily transported to a remote location and put together so as to cook large foods or large amounts of food.

As noted above, a pig roast is often a desirable activity. In the past, however, it appears that the preferred way to prepare a pig was on a spit. This requires an open fire that can be difficult to maintain and could potentially be illegal in some places. Hence there is a need for a device that can provide an alternative method for the cooking of a food such as a pig.

SUMMARY OF THE INVENTION

The various embodiments of the present invention provide inventive subject matter which overcomes many of the problems and satisfies the needs of the outdoor cooking industry. One object of an embodiment of the invention is to cut down on the material required for an outdoor oven. A second object is to provide a fuel container that can provide heat for an outdoor oven while at the same time permitting collapsibility of the oven. Collapsibility, portability, compactability, low cost, low weight, durability, and reusability of an outdoor oven are generally individual objects of various embodiments of the invention as well. Another object is to provide an outdoor cooking device that can serve as both an oven and a griddle. In addition, an object is to provide an expandable oven chamber and an apparatus and method for constructing such an oven chamber that permits the cooking of a large amount of food.

These objects can be achieved through the present invention disclosed herein. An outdoor oven can be utilized that has a structure that permits it to be collapsible. As part of the camping oven, a fuel container can be utilized to provide heat to the oven chamber while at the same time permitting itself to be removable so as to facilitate portability and collapsibility. A low weight device can be accomplished by taking advantage of the ground to serve as an oven wall for the oven chamber. This leads to a reduction in components of the outdoor oven, and thus achieves many of the goals of the invention. An oven chamber can be utilized in proximity to a griddle surface. In this fashion, the radiation of the heat from the oven chamber can also serve to heat the griddle so as to provide a griddle surface simultaneously with an oven chamber in a camping range. In addition, an oven wall that can support a second oven wall allows the oven to be expanded to increase the size of the oven chamber. This provides for the cooking of large dishes such as several turkeys or the roasting of a pig.

Other objects and advantages of the invention will become apparent from a consideration of the following detailed description taken in connection with the accompanying drawings wherein certain methods of and installations for practicing the invention are illustrated. However, it is to be understood that the invention is not limited to the details disclosed but includes all such variations and modifications as fall within the spirit of the invention and scope of the appended claims.

BRIEF DESCRIPTION OF THE DRAWINGS

The present invention will be further illustrated by way of the accompanying drawings in which.

DESCRIPTION OF THE PREFERRED EMBODIMENTS

Figure 1:
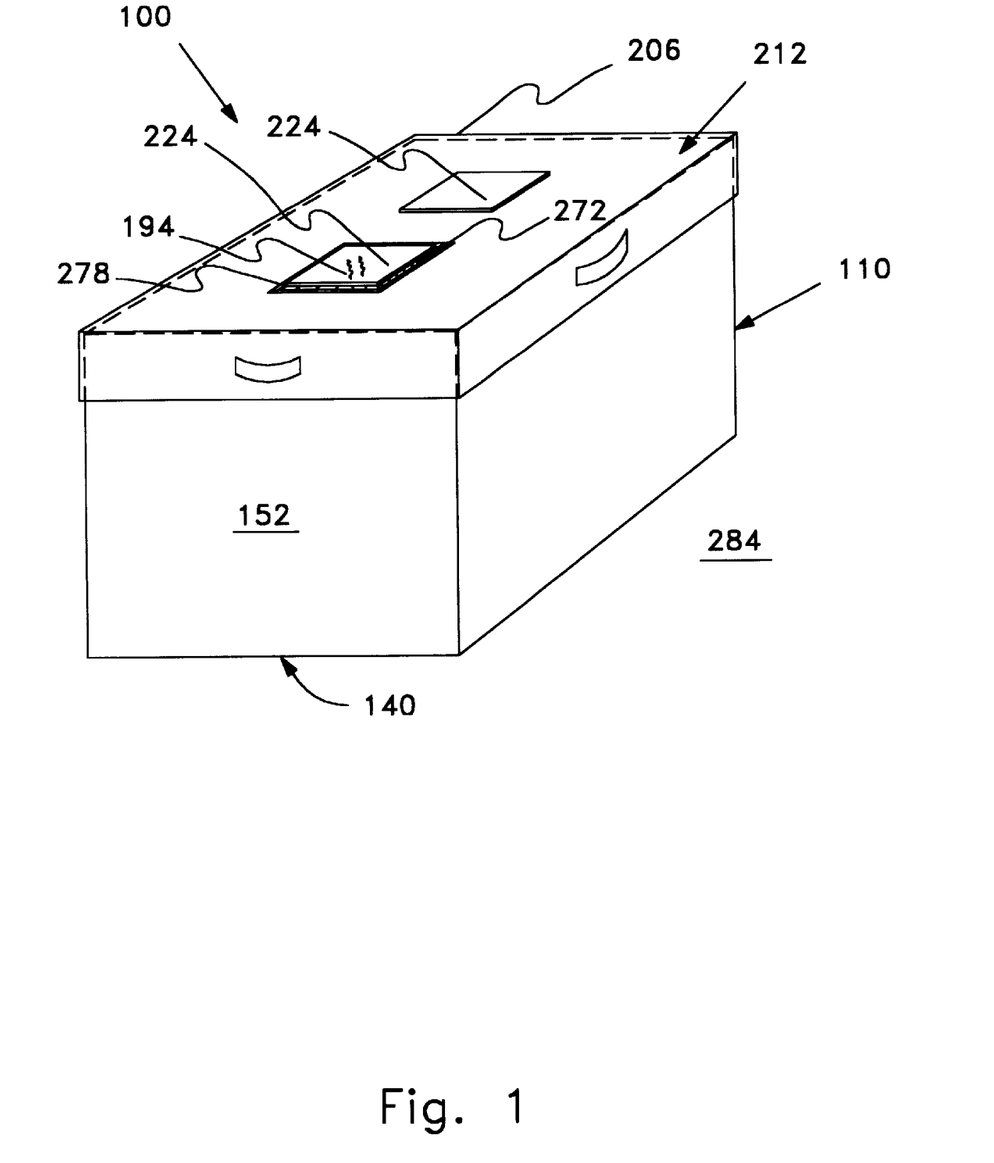
FIG. 1 is a perspective view of the camping range shown with a removable cover installed on the wall structure.

Referring now to the drawings, a camping range and method of constructing a camping range can be seen in greater detail. In FIG. 1, a perspective view of a camping range is shown. In this figure, one can see a camping range that utilizes a wall structure (110). The wall structure can be situated on a ground surface (284) such that an open bottom end defined by the wall structure sits against the ground surface. Furthermore, a cover (206) can be provided to sit adjacent to the wall structure and to cover an upper opening defined by the wall structure. In this fashion, an oven chamber (152) can be established for the cooking of food. Furthermore, a griddle can be provided on the cover itself such as griddle (224) shown in FIG. 1. For purposes of this patent, a camping range is considered to be a cooking unit that comprises not only an oven but also a griddle and that is suitable for use in a camping environment.

Figure 7:
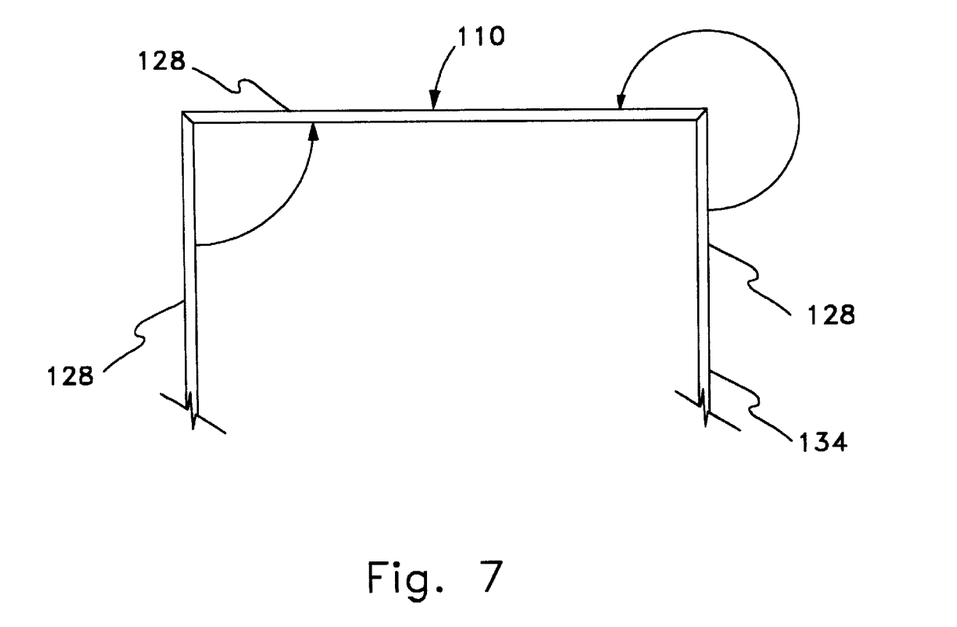
FIG. 7 is a top view of an embodiment of a wall structure showing a hinged arrangement for three walls that can be collapsed down into a compact unit.

Turning now to the individual components of this embodiment of the invention, the characteristics of these individual components can be seen in greater detail. A wall structure (110) can be provided to establish a wall for the camping range (100). Such a wall structure can be suitable for positioning on a ground surface as one would often encounter in a camping or outdoor environment. As can be seen in FIG. 7, the wall structure (110) can be comprised of side walls (128) of the wall structure. A plurality of side walls can be used. In FIG. 7, a collapsible wall structure is shown for use in creating a collapsible oven. A collapsible wall structure is intended to mean a wall structure that has a normal erected configuration, yet can be broken down to a substantially less voluminous configuration. This could be accomplished, for example, by making the wall structure out of several panels or wall elements that are hinged together to form the wall structure. In this manner, the panels could fold into a low profile arrangement. Or, as another example, the wall elements forming the wall structure might be separable from one another to facilitate horizontal stacking or nesting. Similarly, a collapsible oven is intended to mean an oven that has a normal erected configuration, yet can be broken down into parts that comprise a substantially less voluminous configuration.

Figure 17:
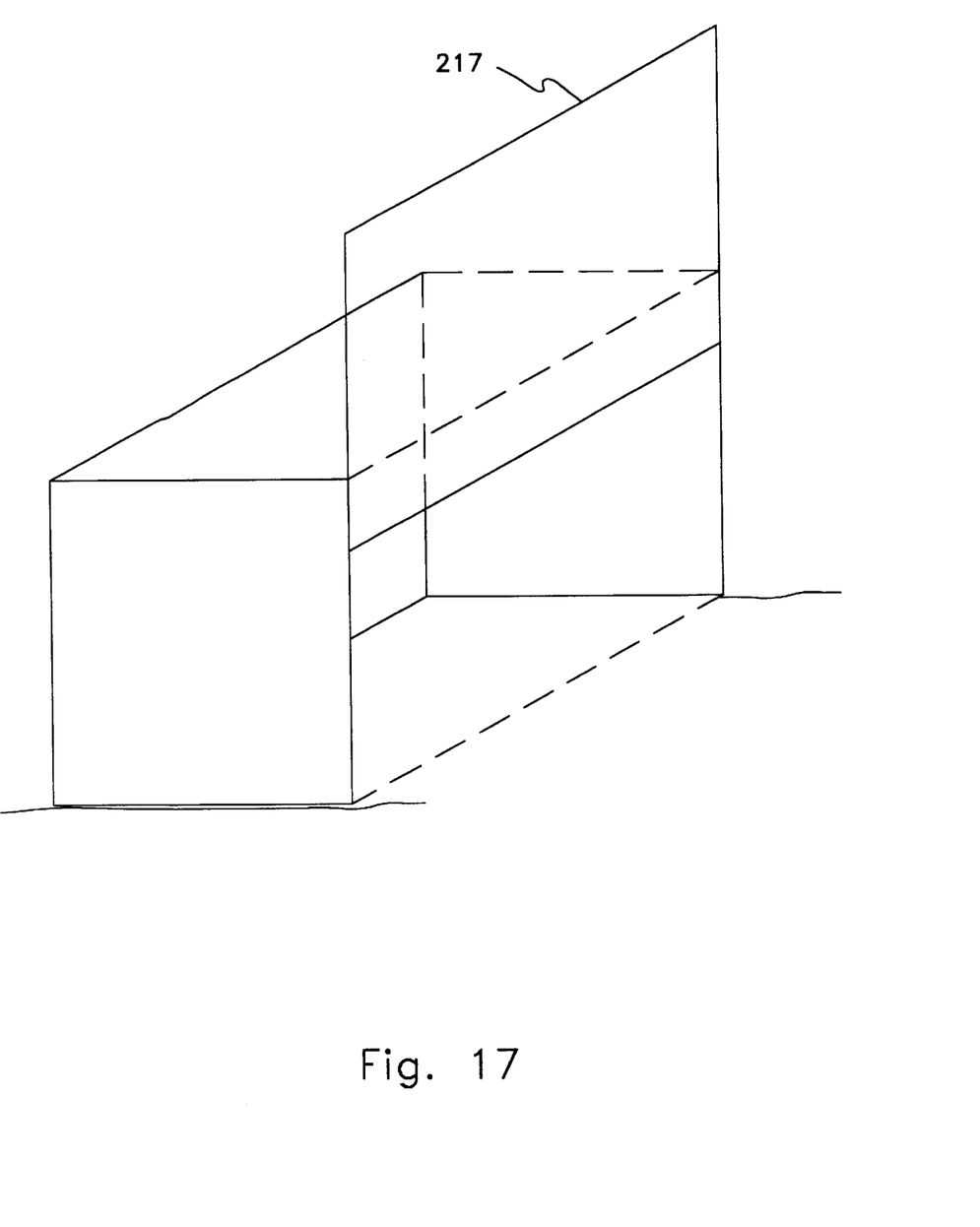
FIG. 17 shows a perspective view of an oven unit with a sliding wall in a partially removed position.
Figure 18:
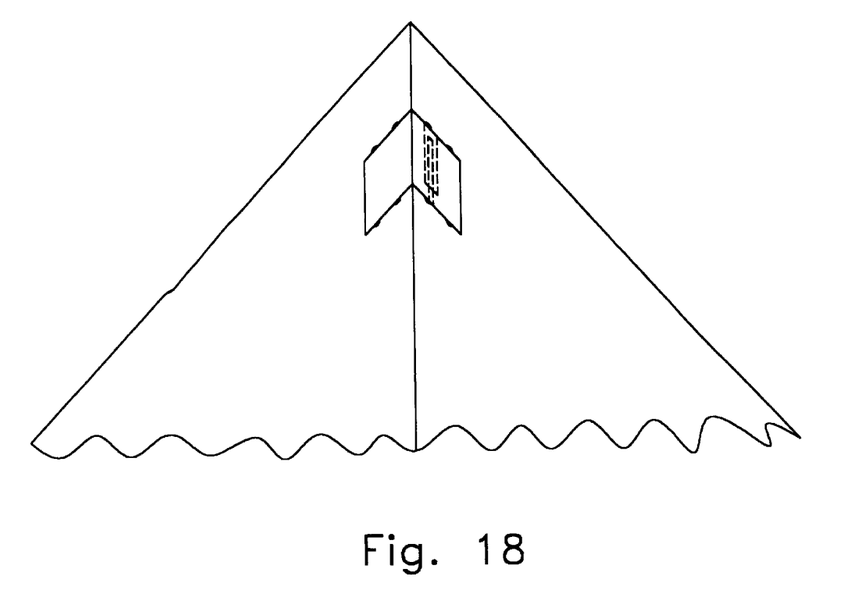
FIG. 18 shows two walls coupled by a slot pin arrangement.
Figure 19:
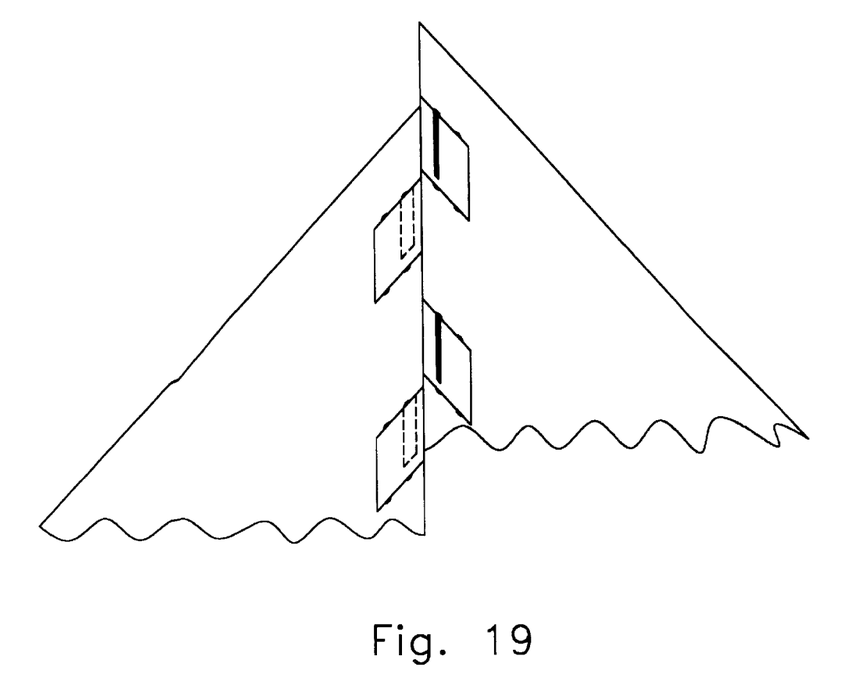
FIG. 19 shows two walls with the slot pin arrangement of FIG. 18 but in an uncoupled configuration.

The embodiment of a collapsible wall structure shown in FIG. 7 is comprised of three side wall panels (128) that can be hinged together. Alternative methods of attaching these side wall panels to one another could be used as well. While FIG. 7 does not show it, a fourth side wall panel could be either hinged to the wall structure shown or could slidably engage the two vertically directed side walls shown in FIG. 7 such that the fourth side wall could slide between those side walls. As shown in FIG. 17, a slidable fourth wall (217) has the advantage that it can be removed from the other three side walls permitting food to be inserted or removed from the oven chamber established by the wall structure. The wall structure shown in FIG. 7 is quite useful in its collapsible arrangement because it permits the side walls to be folded onto one another in a very compact arrangement. For example, the leftmost side wall can be folded flat against the horizontally shown side wall and the rightmost side wall can be folded on the other side of the horizontally shown side wall. Then, with the fourth and remaining side wall which was slidably removed, the entire wall structure can be arranged in a very compact arrangement for portability. Such a compact arrangement can be seen in FIG. 8 where the three side wall units are placed at the bottom of the storage receptacle and the fourth or front side wall is shown on top of the fuel containers. FIGS. 18 and 19 show an additional manner of attaching the side walls by using slip joints. In this fashion, a pin on one wall can be inserted in a receptacle on an adjoining wall to establish a hinge joint.

An insulation material (134) can be provided to retain heat within an oven chamber (152) defined by the wall structure (110). Such insulation can be seen in FIG. 7 disposed on an internal section of a wall section (128) of the wall structure. This insulation material can be suitable for substantially reducing the loss of heat from an oven chamber (152) by retaining heat within the oven chamber. One insulation material that has been found suitable for use in an outdoor oven is pre-molded fiberglass board for thermal applications, such as H-Board™ manufactured by ICA Corporation of Lehighton, Pa. Insulation material suitable for substantially reducing the loss of heat from the oven chamber is intended to mean material that provides more than an incidental insulating effect—but rather that is intended to act as a heat insulator such as accomplished by the material referenced above.

Figure 3:
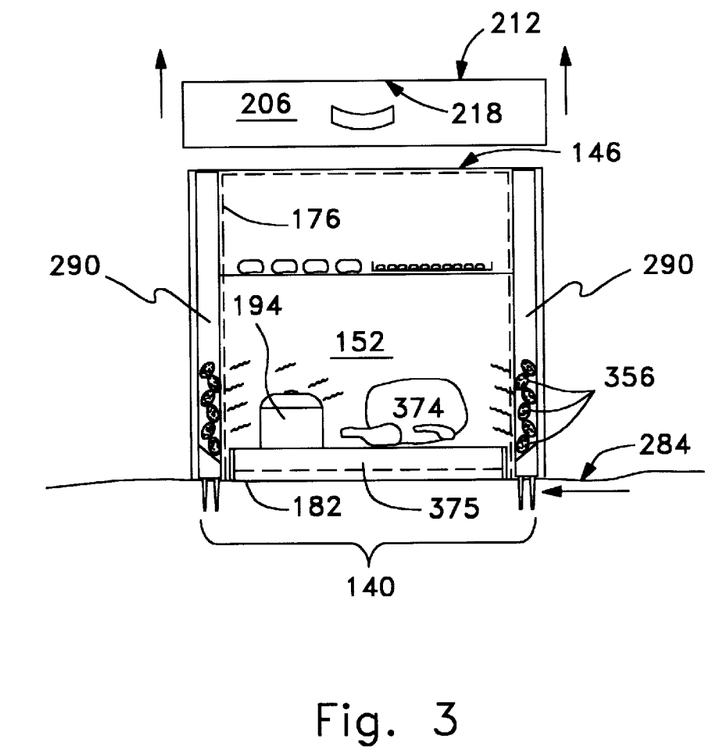
FIG. 3 is a side view of a camping range with a removable cover showing removal of the cover from the top of the camping range.

As noted earlier, an open bottom end (140) can be provided proximate to the wall structure. Such an open bottom end can be seen in FIG. 1 where the wall structure (110) sits on a ground surface (284). This four sided wall structure allows both an open bottom end and an open top end. The open bottom end is located close to, i.e., proximate to, the ground surface when the wall structure is placed on the ground surface. In this fashion, the ground surface can be utilized to establish an internal boundary (182) of an oven chamber (152) established by the wall structure. Furthermore, the wall structure can define an upper opening (146). FIG. 3 shows such an upper opening (146) where a cover (206) is being removed from its location atop the wall structure. The fact that an oven chamber can be established with this type of device by using only a few parts is a great advantage to the present invention. Not only does this wall structure allow one to quickly erect an oven (e.g., in less than a minute), it also allows the wall structure to be reusable, to be portable, to be inexpensive, to be light in weight and to be very compact.

Figure 15:
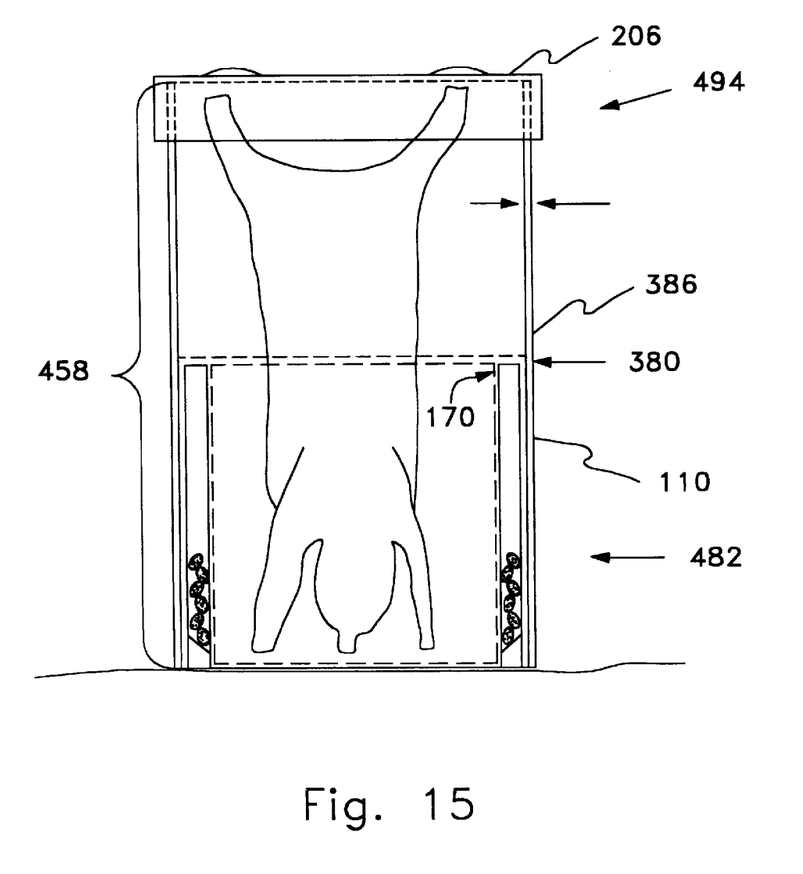
FIG. 15 shows an embodiment of the invention where an oven is oriented in a stacked arrangement such that a large food, such as a pig for roasting, can be contained within the oven chamber of the camping.

An oven chamber (152) can be established by the present invention. As can be seen in FIG. 3, an enclosed volume of an oven chamber can be configured. This type of enclosed volume should be suitable for the cooking of food and preferably a totally enclosed volume rather than partially open to the ambient atmosphere. It should be understood, however, that a totally enclosed volume is intended to include embodiments with small openings that permit the circulation of air—such as in convection air heating. The oven chamber (152) will have an initial volume (170) as can be seen in FIG. 15 by the dotted border outline. This initial volume can be increased in several embodiments of the invention such that the initial oven volume is increased in size. In FIG. 3, a boundary (176) of the oven chamber can be seen. The boundary (176) of the oven chamber can be defined by a variety of components of the invention. For example, the sides of the boundary of the oven chamber can be defined by the wall structure (110), while the bottom surface of the oven chamber can be defined by the ground surface (140) and the top of the oven chamber can be defined by an internal surface of a cover (206). However, it may be that only portions of the boundary of the oven chamber are defined by these components.

As noted earlier, a major drawback of prior devices has been the lack of a large volume oven chamber which can cook a large amount of food. A traditional camping oven is sized at the largest to hold a single turkey. However, it is often desirable to use the oven chamber to heat other items while the main course is cooking. Thus, a large oven chamber can be used—namely, an oven chamber that permits the cooking of an average sized turkey while easily allowing the cooking of additional items in the oven chamber simultaneously. The oven chamber can be increased in size so as to facilitate the cooking of a pig and thus serve as a pig roaster. A pig roaster, for purposes of this patent will be considered to be any oven chamber that facilitates the cooking of a pig weighing over 100 pounds. It is often desirable to cook more than one turkey in an oven at a gathering of friends. This appears difficult to do with any prior portable camping oven. To accomplish this requires a large volume oven chamber that is suitable for the cooking of such foods. As can be seen in FIG. 3, the embodiment shown in that figure permits a large volume oven such that not only could two turkeys be roasted on the bottom layer, but also a rack for possibly cooking other food such as potatoes, biscuits, etc., could be utilized simultaneously. In this way, a great amount of food could be cooked for a large gathering of people at a site where cooking facilities are not available. Thus, the device shown in FIG. 3 accomplishes many of the goals of the present invention.

Figure 4:
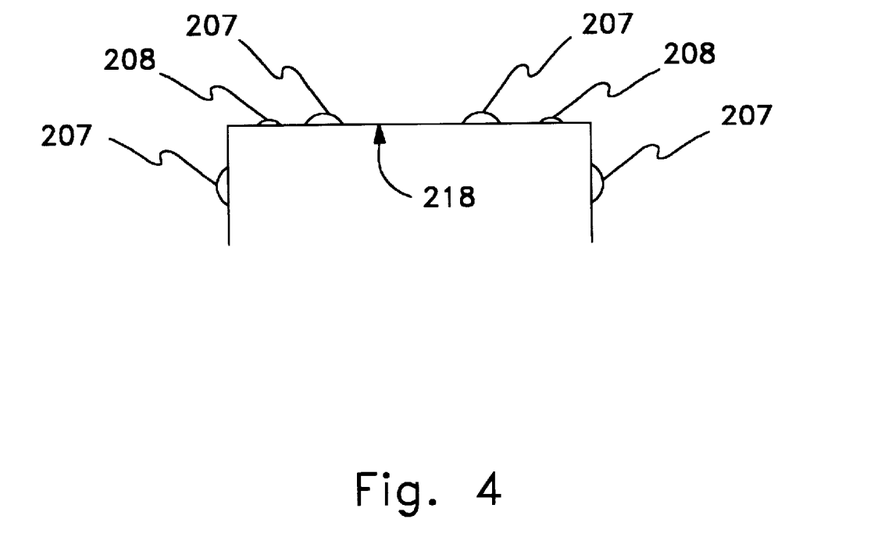
FIG. 4 is a side view of a removable cover.
Figure 5:
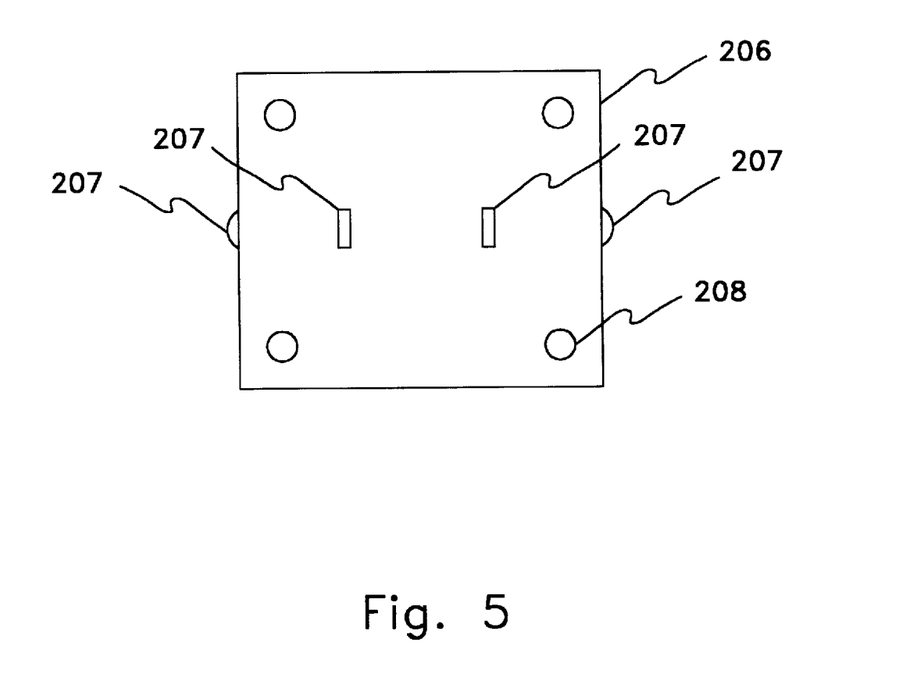
FIG. 5 is a top view of the cover shown in FIG. 4 showing arrangements of possible handles for the cover.

Another component of the invention is the cover (206). The cover can be seen from a perspective view in FIG. 1. It can sit in proximity to the wall structure (110) so as to establish a top to the wall structure. Proximate is intended to mean close to or very near the wall structure. Other objects could be located in between the cover and the wall structure under this meaning. In FIG. 4, a side view of a cover can be seen. This cover (206) utilizes handles (207) on the sides and tops for easy manipulation of the cover when in use. A top view of the cover can be seen in FIG. 5. Again handles can be seen on the top as well as the sides. The removable cover is unique in that it can perform a great deal of functions in addition to the act of serving as a cover. For example, it can serve as a griddle, a wash basin, a frying pan, and a storage receptacle for the remaining components of the camping range. The cover can utilize an external surface (212) which can be made of a thin steel such that heat easily radiates to the top surface for the purpose of heating a food. Furthermore, the cover can have an internal surface (218) that defines an internal surface of the oven chamber (152). This can be seen in FIG. 3 where the internal surface of the cover (218) is shown as the cover is removed from the wall structure.

A griddle (224) can be provided on the cover (206). Because the cover can be adapted to facilitate heat radiation from the oven chamber to the external surface, the external surface can be used as a griddle. A griddle is intended to mean any substantially flat, substantially continuous, heatable surface, especially on the top of a range, for the cooking of food. By definition, it must be able to do more than just radiate heat. For example, it could be used to boil water in a pan or to directly fry an egg without the need for a skillet. It also must be configured to support a pan in a stable manner. For example, a rounded surface which by happenstance is hot enough to heat a pan would not be considered a griddle as it is not intended for use as a griddle nor for stably supporting a pan. A griddle surface lip (215) can be extended around the edge of the griddle surface. Such a lip is shown inverted in FIG. 6. This lip could act to provide a reservoir of oil for cooking purposes or to retain grease produced during cooking on the griddle when the cover is utilized in a griddle orientation (rather than the wash basin orientation shown in FIG. 6).

Figure 6:
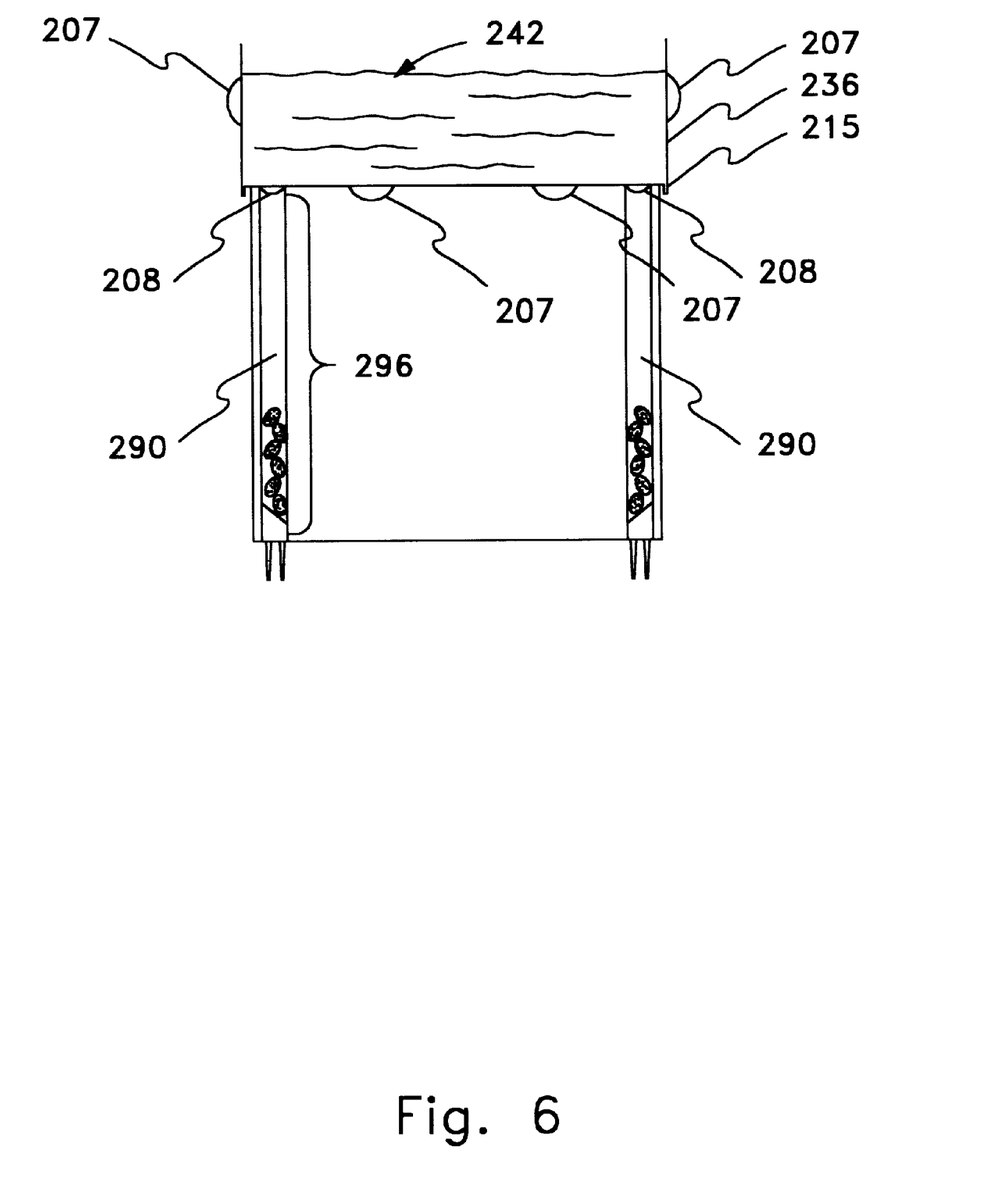
FIG. 6 shows an embodiment of the invention with the removable cover being used as a wash basin and oriented on the wall structure with the fuel containers oriented in a vertical position.

In addition to its use as a cover to define a boundary of the oven chamber or as a griddle, the cover can also be used as a wash basin (236), i.e., a device used to hold liquid for the washing of cooking utensils such as frying pans, silverware, dishes, etc. Such a wash basin can be seen in a side view in FIG. 6. In FIG. 6, the cover is shown in an inverted position from that shown in FIG. 1. Nipples (208) on the top of the cover as it is shown in FIG. 4, can fit in a fuel container (290) so that the wash basin sits securely above the wall structure. The water (242) can then be added to the wash basin (236) and the heat from within the oven chamber can then heat the water. In this fashion, the present invention is very useful in that once a meal is complete, the dirty dishes and dirty cooking utensils can be cleaned. Therefore this embodiment of the invention not only is useful for the cooking phase of the meal, it is also useful for the cleaning phase after the meal takes place. In addition, with a hot enough fuel source, the wash basin could even be used to bring water to a boil and therefore serve as a very large pot. This might be useful at an outdoor gathering where one desires to cook crawfish, lobsters, clams or other food.

Figure 8:
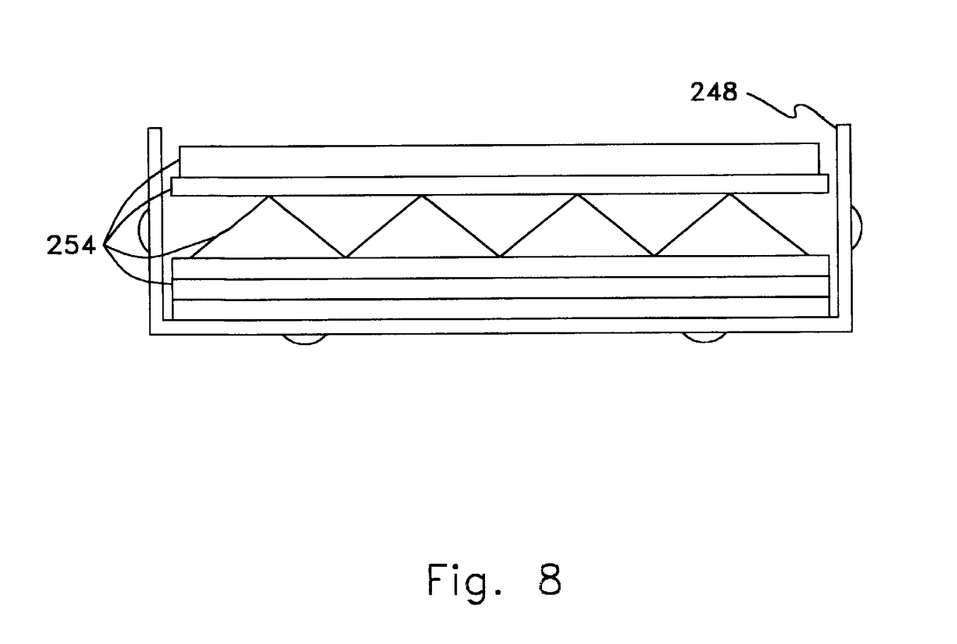
FIG. 8 shows an embodiment of the camping range in a collapsed position where the removable cover is being used to hold all the components of the camping range.

The cover (206) can be utilized in yet another fashion by storing the component parts of the oven. For example, as shown in FIG. 8, the component parts of the oven (254) can be seen stowed in the cover. In this figure, the triple wall shown in FIG. 7 is shown disposed on the bottom of the storage receptacle (248) with four fuel containers stowed in a horizontal position above them. Furthermore, the front side of the wall structure can be placed above the fuel containers and even a grill or grate with folded-in legs can be placed on top of the front side wall. This embodiment demonstrates the extreme compactness of the invention as well as the portability and functionality of the cover (206) acting as a storage receptacle (248). By selecting a cover size of sufficient dimension, the cover can be configured or sized to serve as a storage receptacle for all the pieces of the camping range (254).

The griddle on the cover (206) can be seen in FIG. 1. In this embodiment, two griddles (224) are shown. One of these griddles utilizes depressions around the griddle surface and proximate to the griddle surface to collect fluid (278) flowing from food cooked on the griddle surface. One can imagine grease and bits of food that can be collected in these depressions around the griddle. Alternatively, the remaining griddle shown in FIG. 1 can be used without these depressions if desired. In other versions, almost the entire cover surface could be used as a griddle.

Figure 2:
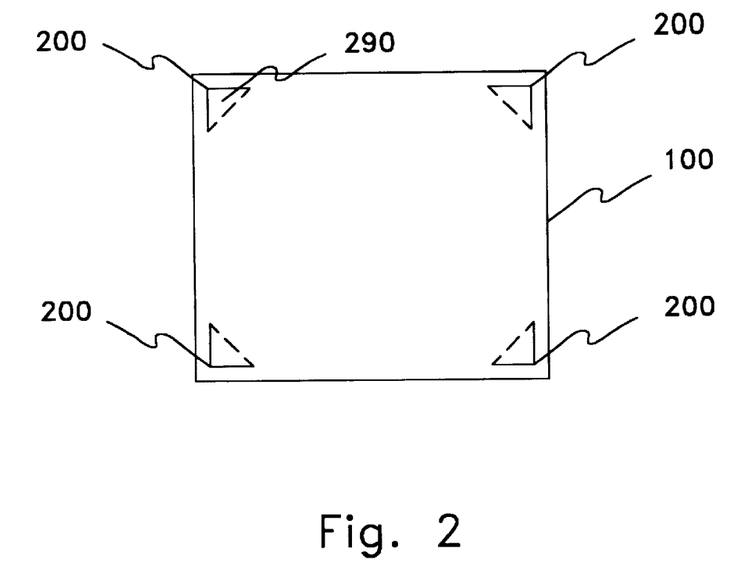
FIG. 2 is a top view looking down on the camping range shown in FIG. 1.
Figure 12:
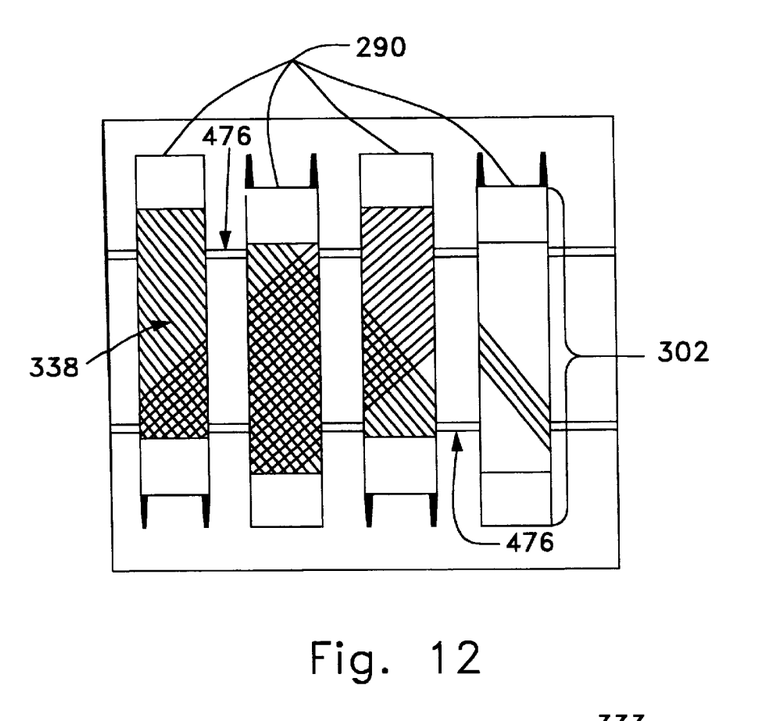
FIG. 12 shows a top view looking down onto an embodiment of the camping range with fuel containers oriented in a horizontal position.
Figure 13:
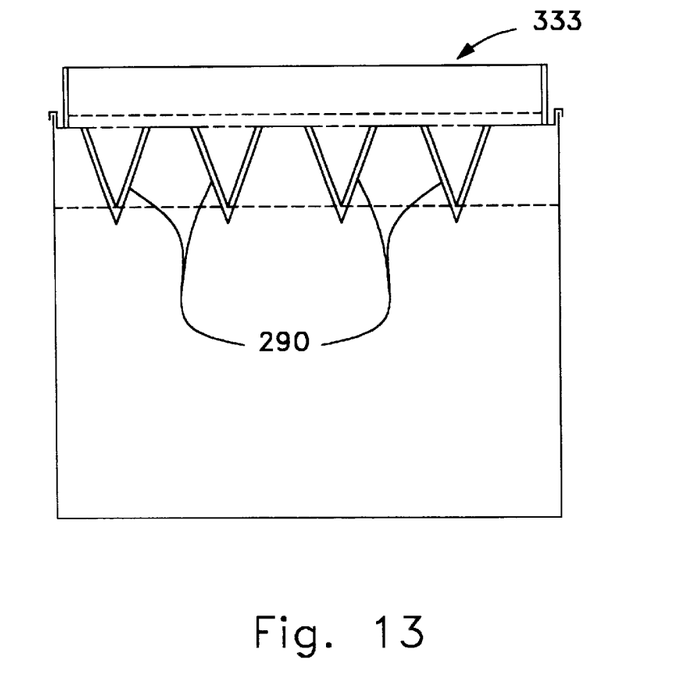
FIG. 13 shows a side view of a camping range with fuel containers oriented in a horizontal position and with a grate located on top of the fuel containers.

A unique feature of the present invention utilizes a container (290) that is suitable for the storing of fuel. Such a container can be provided such that it is configured for placement within the oven chamber so as to be the source of heat for the oven. For example, when the wall structure is placed on the ground surface, a plurality of containers can be used with one container in each corner of the space defined by the wall structure. This can be seen in FIG. 2 where the fuel containers (290) are disposed in the corners (200) of the wall structure of the camping range (100). A unique feature of the present invention is that the fuel containers can be oriented in a variety of positions. For example, the fuel container (290) can be utilized by orienting the fuel container in a vertical position (296) as shown in FIG. 6. In this manner the fuel container can provide heat to the oven chamber. This heat can then radiate upward to heat the wash basin (236). The vertical position is the preferred position for the cooking of food in the oven chamber (152) as well. In addition to the vertical position, the fuel container (290) can also be oriented in a horizontal position (302). This can be seen in FIG. 12. In its horizontal position, the fuel container can provide heat closer to the top of the wall structure. For example, it can serve as a source of heat for the griddle. Alternatively, it could even be used as a grill, for example if a plurality of fuel containers were located side by side. As shown in FIG. 12, the fuel containers can be laid across supporting braces to establish a firm position atop the braces. FIG. 13 shows an alternative arrangement in which a grill or grate is placed atop the fuel containers.

Figure 9:
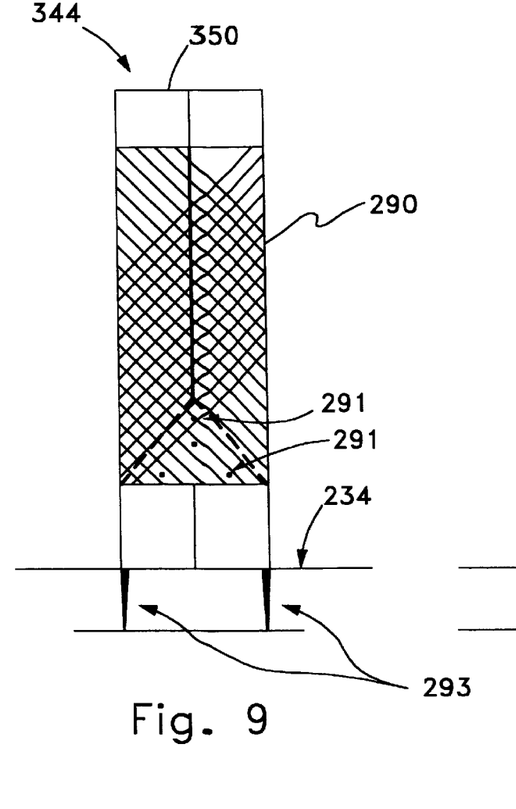
FIG. 9 shows a front view of a fuel container installed in the ground.
Figure 10:
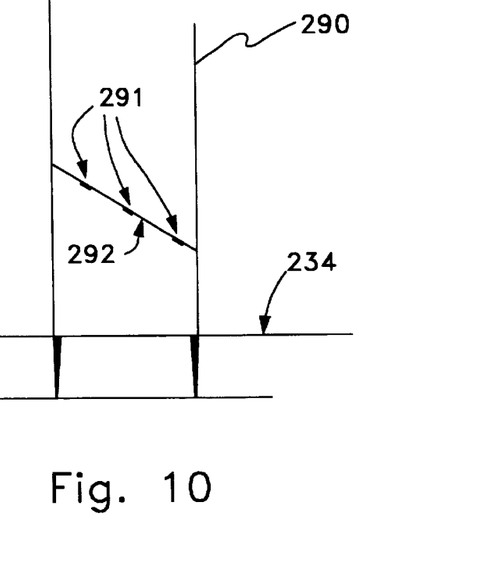
FIG. 10 shows a side view of the container shown in FIG. 9.
Figure 11:
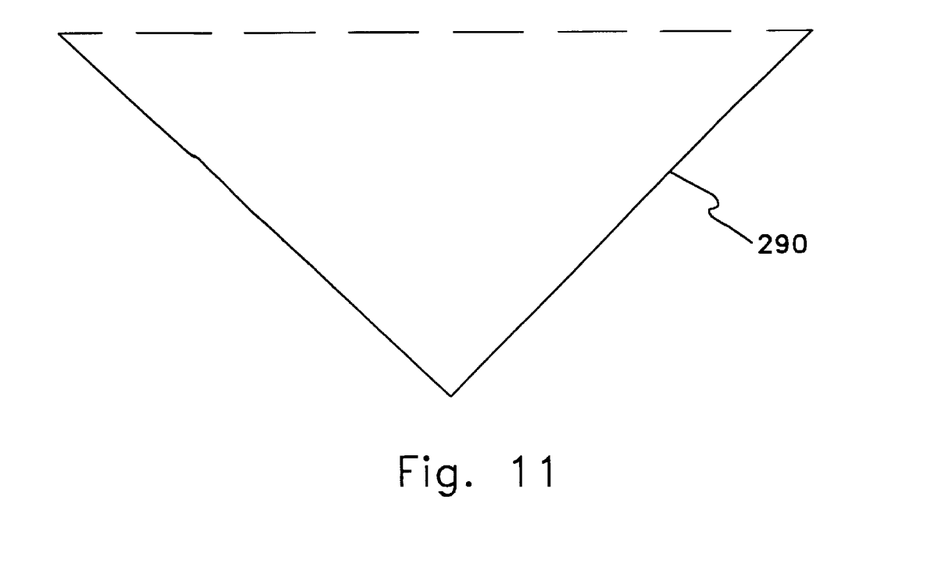
FIG. 11 shows a top view looking down into the container shown in FIGS. 9 and 10.

One potential source of fuel for the fuel containers would be charcoal. When charcoal is used, the fuel container would be a charcoal heating post. Such use of charcoal can be seen in FIG. 3 where the fuel (356) is comprised of charcoal coals. The FIGS. 9, 10 and 11 show an embodiment of a fuel container. In these figures, the top of the fuel container (344) is comprised of an opening (350) that permits the insertion of fuel from the top. The fuel then drops down along the enclosed container allowing the fuel to come to a rest along an ash plate (292) oriented diagonally as shown in FIG. 10. The ash plate is comprised of air holes (291) that allow air to circulate from the bottom of the fuel container and provide combustion air for the heating of the charcoal and the flow of air through the oven. By providing a diagonally oriented ash plate, the ashes from the spent coal can drop through the air holes such that room for new coals is provided in the fuel container. An embodiment of a charcoal post might utilize a three-sided device in which one side utilizes expanded stainless steel while two sides utilize solid steel. The expanded stainless steel side would face toward the center of the oven to radiate heat toward the cooking area. This can be seen in FIG. 2. Ground spikes (293) can be utilized to secure the fuel container in the ground. When a whole container of coals is inserted, the bottom coals can be lit. Then as these coals burn and fall away as ash, new coals can take their place. This permits a constant temperature to be maintained in the oven chamber. Such a temperature can be reduced by varying the size or number of fuel containers used.

An additional characteristic of the fuel container is that it can be a removable fuel container. In this way it is adapted for positioning at a variety of positions within the oven chamber. As noted earlier, it can be established in a vertical position or a horizontal position plus it can be oriented in any of the desired corners or walls along the oven chamber boundary. Furthermore, by being removable, it can be utilized to act as a grill (338) as shown in FIG. 12. In its horizontal position it is also suitable for utilizing as a source of heat for heating water as well as suitable for utilizing as a source of heat for the griddle of the removable cover. In this manner the removable fuel container can be utilized in a variety of positions to accomplish a variety of heating functions. Importantly, the removable characteristic facilitates the portability and compactability of the camping range by allowing the fuel container to be removed from the oven chamber.

Figure 14:
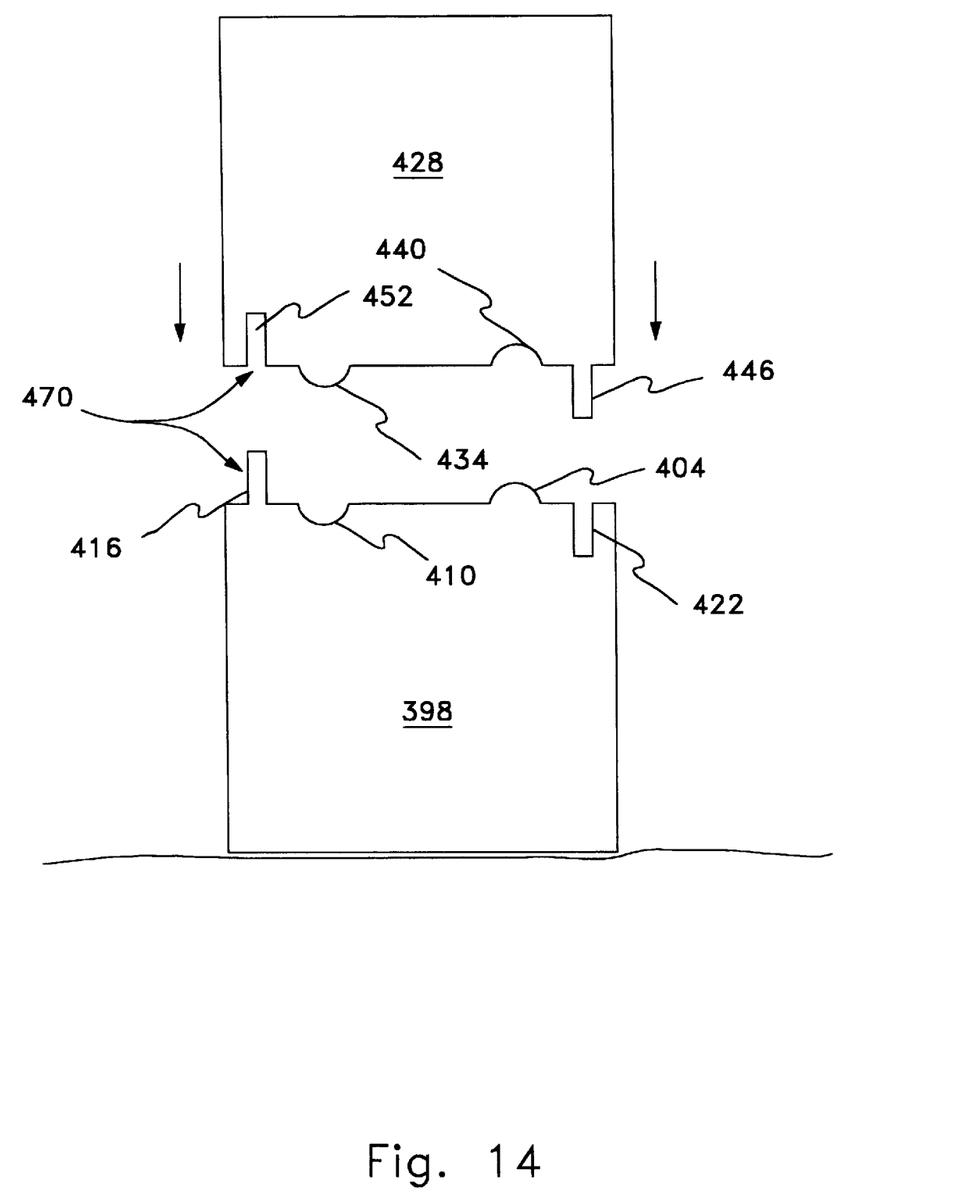
FIG. 14 shows a wall unit installed in a vertical position on a ground surface and a second wall unit being coupled onto the first wall unit.
Figure 16:
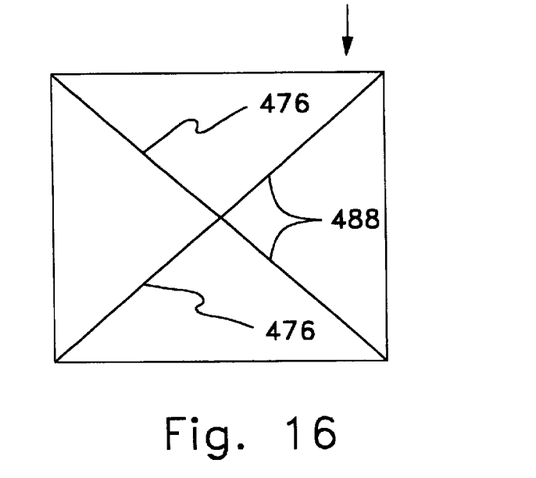
FIG. 16 shows a top view and a bracing and support arrangement for the oven shown in FIG. 15.

As noted earlier, a drawback to earlier devices has been the lack of space or volume provided in the cooking chamber of the outdoor oven. Even indoor ovens have a limited amount of space that can be utilized for cooking very large foods, such as a pig. In fact, it is unknown whether such an indoor device even exists. However, it is often desirable for large gatherings, to cook a large amount of food or to even roast a pig. In the past, pig roasts have by necessity involved cooking such pigs on a spit over an open fire requiring that the pig be exposed to the outdoor elements such as insects and rain. Furthermore, much of the heat from the fire is lost due to the uncontained nature of the cooking. Alternative cooking arrangements have involved burying the food in coals in the ground. However, this involved a great deal of work and is of questionable sanitary practice. Therefore, one embodiment of the present invention is very useful for the cooking of a large amount of food at an outdoor gathering or on a camping trip. The present invention can be utilized to expand the initial oven chamber volume (170) to an enlarged volume as shown in FIG. 15. This involves providing a first wall structure (110) that can serve as a base (380) for the second wall structure (386). The second wall structure (386) can be coupled to the first wall structure so as to increase the volume of the oven chamber. FIG. 14 shows a typical oven wall that can be utilized for this aspect of the invention. FIG. 14 shows a first camping oven wall (398) that has been provided in position on a support surface. The first camping oven wall (398) can be configured to be oriented vertically relative to the support surface. A second camping oven wall (428) can be provided such that it removably couples with the first camping oven wall (398). This is shown in FIG. 14 by the arrows directed downward showing movement of the second oven wall toward the first oven wall. In this fashion, the first and second oven walls can be stacked end-to-end, e.g., one located above the other, so as to form a wall greater in height than a mere single wall. This permits the size of the oven chamber to be increased while still permitting the oven to be compact when it is broken down into a collapsed configuration. Thus, the oven can be easily stored and transported. A variety of means for coupling could be utilized to couple the first and second camping oven walls together. For example, a protrusion (404) on the first oven wall could be configured to engage an indentation (440) on the second oven wall. Alternatively, a protrusion (434) on the second oven wall could be utilized to engage an indentation (410) on the first oven wall. Similarly, male piece (416) on the first oven wall and female piece (452) on the second oven wall could be utilized to couple the oven walls together in a socket coupling mechanism (470), or alternatively, a male piece (446) on the second oven wall could be utilized with a female piece (442) on the first oven wall. In this manner the first and second oven walls could be configured so as to establish an end-to-end stackable configuration (458) as shown in FIG. 15. This end-to-end stacked arrangement would allow a greater volume to be established in the oven chamber (152). FIG. 15 shows the use of such an arrangement to configure the oven as a pig roaster (482). As can be seen in FIG. 16, braces (476) between the side walls can be utilized to stabilize the enlarged oven chamber. These stabilizer cross bars can also be used to hold the food. For example, they could be used as a pig carcass hanger. Such a support (488) can be provided for supporting large loads such as the weight of a pig. Typically these supports would be located at the top of the camping oven (494) for foods that would be suspended. However, alternatively, trays might be supported at a variety of locations within the camping oven so as to cook a plurality of different foods such as cooking several turkeys at the same time or cooking a pan of rolls or biscuits.

It is thought that the apparatuses and methods of the embodiments of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A camping range comprising:

a wall structure;

an oven chamber within the wall structure having an enclosed volume suitable for the cooking of food;

a multi-purpose cover adapted for placement proximate to the wall structure;

wherein the cover is configured to serve as a griddle in a upright position and as a basin for liquids in an upside down position; and at least one triangular corner fuel container, the fuel container suitable for placement in the oven chamber.

2. The camping range as described in claim 1 wherein the cover is removable.

3. The camping range as described in claim 1 wherein the wall structure is collapsible.

4. The camping range as described in claim 1 and further comprising depressions proximate to the griddle configured so as to act as a collector of fluid flowing from the griddle.

5. The camping range as described in claim 1 wherein the wall structure defines at least a portion of the boundary of the oven chamber.

6. The camping range as described in claim 1 or 3 wherein the cover is configured to serve as a wash basin.

7. The camping range as described in claim 1 or 3 wherein the cover is removable and wherein the removable cover is configured to serve as a storage receptacle for at least the wall structure of the camping range.

8. The camping range as described in claim 7 wherein the removable cover is configured to store all of the pieces of the camping range.

9. The camping range as described in claim 7 wherein the removable cover is configured to serve as a wash basin.

10. The camping range as described in claim 1 wherein the fuel container is removable from the oven chamber and wherein the fuel container is configured for orienting in a vertical position in the oven chamber to serve as a source of heat for the oven chamber and wherein the fuel container is configured for orienting in a horizontal position in the oven chamber to serve as a source of heat for the griddle.

11. The camping range as described in claim 1 wherein the oven chamber is configured to act as a pig roaster.

12. The camping range as described in claim 1 wherein the wall structure comprises wall sections.

13. The camping range as described in claim 1 wherein the wall structure provides a base for a second wall structure so as to increase the volume of the oven chamber.

14. The camping range as described in claim 1 wherein the wall structure is configured to allow a ground surface to define an internal surface of the oven chamber.

15. The camping range as described in claim 1 wherein the wall structure comprises side walls and wherein the side walls are insulated.

16. A method of constructing an oven comprising:

providing a wall structure for the oven;

establishing an oven chamber within the wall structure;

providing a multi-purpose cover adapted for covering an opening defined by the wall structure;

providing for a griddle by use of the cover in a upright position;

providing for a basin for liquids by use of the cover in an upside down position; and providing at least one charcoal heating post configured for positioning in both a vertical and a horizontal orientation within the oven chamber.

17. The method as described in claim 16 and further comprising providing a removable cover.

18. The method as described in claim 16 and further comprising providing a collapsible wall structure for the oven.

19. The method as described in claim 16 and further comprising providing depressions in the cover configured to collect fluid flowing from the griddle.

20. The method as described in claim 16 and further comprising utilizing the wall structure to define a portion of the oven chamber.

21. The method as described in claim 16 or 18 and further comprising utilizing the cover to serve as a wash basin.

22. The method as described in claim 16 or 18 and further comprising utilizing the cover to serve as a storage receptacle.

23. The method as described in claim 22 and further comprising sizing the cover so that all of the pieces of the oven fit in the storage container.

24. The method as described in claim 22 and further comprising configuring the removable cover to serve as a wash basin.

25. The method as described in claim 16 and further comprising providing a wall structure having wall sections.

26. The method as described in claim 16 and further comprising providing the wall structure so as to support a second wall structure.

27. The method as described in claim 16 and further comprising configuring the wall structure so that a ground surface defines an internal surface of the oven chamber when the wall structure is placed on the ground surface.

28. The method as described in claim 16 and further comprising utilizing insulation to insulate the wall structure so as to retain heat within the oven chamber.

29. A method of constructing an oven comprising:

providing a wall structure for the oven;

establishing an oven chamber within the wall structure;

providing a multi-purpose cover adapted for covering an opening defined by the wall structure;

providing for a griddle by use of the cover in a upright position;

providing for a basin for liquids by use of the cover in an upside down position; and providing at least one charcoal heating post configured for orienting in a vertical position in the oven chamber to serve as a source of heat for the oven chamber and configured for orienting in a horizontal position in the oven chamber to serve as a source of heat for a griddle.

30. The method as described in claim 29 and further comprising providing a removable cover.

31. The method as described in claim 29 and further comprising providing a collapsible wall structure for the oven.

32. The method as described in claim 29 and further comprising providing depressions in the cover configured to collect fluid flowing from the griddle.

33. The method as described in claim 29 and further comprising utilizing the wall structure to define a portion of the oven chamber.

34. The method as described in claim 29 or 31 and further comprising utilizing the cover to serve as a wash basin.

35. The method as described in claim 29 or 31 and further comprising utilizing the cover to serve as a storage receptacle.

36. The method as described in claim 35 and further comprising sizing the cover so that all of the pieces of the oven fit in the storage container.

37. The method as described in claim 35 and further comprising configuring the removable cover to serve as a wash basin.

38. The method as described in claim 29 and further comprising providing a wall structure having wall sections.

39. The method as described in claim 29 and further comprising providing the wall structure so as to support a second wall structure.

40. The method as described in claim 29 and further comprising configuring the wall structure so that a ground surface defines an internal surface of the oven chamber when the wall structure is placed on the ground surface.

41. The method as described in claim 29 and further comprising utilizing insulation to insulate the wall structure so as to retain heat within the oven chamber.

* * * * *